US012588591B2

(12) United States Patent
Deruyter et al.

(10) Patent No.: US 12,588,591 B2
(45) Date of Patent: Mar. 31, 2026

(54) RESIDUE COLLECTOR

(71) Applicant: CNH Industrial America LLC, New Holland, PA (US)

(72) Inventors: Lucas Deruyter, Gits (BE); Frederik Tallir, Esen (BE); Geert Bonne, Damme (BE); Arno Leenknegt, Hooglede (BE); Bart M.A. Missotten, Herent (BE); Dré W.J. Jongmans, Klundert (NL); Jasper Vanlerberghe, Aartrijke (BE); Pieter Van Overschelde, Sint-Andries (BE); Sam Reubens, Sint-Michiels (BE)

(73) Assignee: CNH Industrial America LLC, New Holland, PA (US)

( * ) Notice: Subject to any disclaimer, the term of this patent is extended or adjusted under 35 U.S.C. 154(b) by 605 days.

(21) Appl. No.: 18/093,378

(22) Filed: Jan. 5, 2023

(65) Prior Publication Data

US 2023/0225247 A1 Jul. 20, 2023

(30) Foreign Application Priority Data

Jan. 14, 2022 (EP) ..................................... 22151577

(51) Int. Cl.
*A01D 41/127* (2006.01)
*G06Q 50/02* (2024.01)
(52) U.S. Cl.
CPC ......... *A01D 41/1271* (2013.01); *G06Q 50/02* (2013.01)
(58) Field of Classification Search
CPC ............ A01D 41/1243; A01D 41/1271; A01D 43/07; G06Q 50/02
See application file for complete search history.

(56) References Cited

U.S. PATENT DOCUMENTS

| | | | |
|---|---|---|---|
| 5,941,768 A | 8/1999 | Flamme | |
| 8,177,610 B2 * | 5/2012 | Birrell | A01B 79/005 |
| | | | 460/111 |
| 9,078,397 B2 * | 7/2015 | Farley | A01D 41/1271 |

(Continued)

FOREIGN PATENT DOCUMENTS

| | | | | |
|---|---|---|---|---|
| BR | PI0808408 B1 * | 4/2018 | ........... | A01B 79/005 |
| BR | 102019018551 A2 * | 3/2020 | ............ | A01F 12/46 |
| EP | 3766331 A1 | 1/2021 | | |

OTHER PUBLICATIONS

Herman et al., BR-1020198551-A2 (English Translation) (Year: 2020).*

(Continued)

*Primary Examiner* — Adam R Mott
*Assistant Examiner* — Abigail Lee Espinoza
(74) *Attorney, Agent, or Firm* — Buchanan Ingersoll & Rooney PC

(57) ABSTRACT

A residue collector is operable to receive residue from a combine harvester during a training harvesting operation. The residue collector includes a residue separator for separating the processed residue into a first portion and a second portion based on a property of the processed residue; one or more weight sensors for directly or indirectly determining the weight of the first portion and the second portion; and a controller configured to determine a quality factor for the processed residue based on the determined weight of the first portion in relation to the weight of the second portion.

19 Claims, 5 Drawing Sheets

(56)     References Cited

U.S. PATENT DOCUMENTS

| | | | |
|---|---|---|---|
| 10,188,035 B2 * | 1/2019 | Reich ..................... | G06V 20/56 |
| 10,963,751 B2 * | 3/2021 | Ferrari ................. | G06V 20/188 |
| 2006/0046801 A1 * | 3/2006 | Argetsinger ......... | A01D 41/127 |
| | | | 460/59 |
| 2010/0311481 A1 * | 12/2010 | Ritter ..................... | A01F 12/40 |
| | | | 460/112 |
| 2011/0034222 A1 * | 2/2011 | Ricketts .............. | A01D 45/028 |
| | | | 460/42 |
| 2021/0015045 A1 * | 1/2021 | Vandike ................ | A01D 75/00 |

OTHER PUBLICATIONS

Schlesser et al., BR-PI0808408-B1 (English Translation) (Year: 2018).*
European Search Report for European Application No. 221 515 77.8, dated Jul. 5, 2022, 11 pages.
European Search Report for European Application No. 221 515 77.8, dated Oct. 10, 2022, 11 pages.

* cited by examiner

RESIDUE COLLECTOR

CROSS REFERENCE TO RELATED APPLICATION

This application claims priority to European Application No. 22151577.8, filed Jan. 14, 2022, the content of such application being incorporated by reference herein in its entirety.

FIELD OF THE INVENTION

The present disclosure relates to residue collectors that receive crop residue directly from a combine harvester, and subsequent use of information that can be determined from the received crop residue.

SUMMARY OF THE INVENTION

According to a first aspect of the invention, there is provided a residue collector that is operable to receive residue from a combine harvester during a training harvesting operation, wherein the residue collector comprises:

a residue separator for separating the processed residue into a first portion and a second portion based on a property of the processed residue;

one or more weight sensors for directly or indirectly determining the weight of the first portion and the second portion; and a controller configured to determine a quality factor for the processed residue based on the determined weight of the first portion in relation to the weight of the second portion.

Advantageously, such a residue collector can provide a better and more efficient device and method for quantifying the quality of residue that is deposited in the field. It can also enable much more data to be collected in different places and situations. Yet further, it can relate this data to settings of a residue treatment system of the combine harvester (or other parameters of the combine harvester) in an efficient and effective way that can be useful for subsequent harvesting operations.

The controller may be configured to determine the quality factor during the training harvesting operation.

The controller may be further configured to provide an indicator of the determined quality factor to an operator of the combine harvester during the training harvesting operation.

The residue separator may be for separating the processed residue into three or more portions based on one or more properties of the processed residue. The one or more weight sensors may be for directly or indirectly determining the weight of each portion. The controller may be configured to determine the quality factor for the processed residue based on the relative weights of the three or more portions.

The property of the residue that is used to separate it into the first portion and the second portion may comprise one or more of:

the size of elements within the residue;

the shape of elements within the residue;

the density of element within the residue;

the moisture content of the residue; and the colour of the residue.

The residue collector may comprise a trailer, which can be pulled by the combine harvester when in use.

The residue collector may have a residue collection configuration and a residue bypass configuration. In the residue collection configuration, the residue collector may be configured to transfer the residue to components of the residue collector for determining the quality factor for the residue. In the residue bypass configuration, the residue collector may be configured such that the residue bypasses or avoids the components of the residue collector for determining the quality factor for the residue.

The residue collector may further comprise a residue selection component for selectively transferring only part of the received residue to the residue separator.

The controller may be further configured to:

receive one or more sensor values from sensors that are associated with the combine harvester; and store the one or more sensor values and the associated determined quality factor as training data for a machine learning algorithm.

The controller may be further configured to: train a machine learning algorithm based on the training data, wherein the trained machine learning algorithm is for subsequent use during a harvesting operation.

The controller may be further configured to:

receive one or more sensor values from sensors that are associated with the combine harvester;

receive one or more operational parameters of the combine harvester that correspond to the time that the residue was harvested; and train a machine learning algorithm based on the one or more sensor values, the one or more operational parameters and the determined quality factor, wherein the trained machine learning algorithm is for subsequent use during a harvesting operation.

There is also disclosed a controller for a combine harvester, the controller configured to:

receive one or more sensor values from sensors that are associated with the combine harvester during a harvesting operation;

use a machine learning algorithm that has been trained by any residue collector disclosed herein and the received one or more sensor values to determine a calculated quality factor; and present the calculated quality factor to an operator of the combine harvester during the harvesting operation or set one or more operational parameters of the combine harvester during the harvesting operation based on the calculated quality factor.

The controller may be further configured to: set one or more operational parameters of the combine harvester during the harvesting operation based on the calculated quality factor and also based on a target quality factor.

There is also disclosed a controller for a combine harvester, the controller configured to:

receive one or more sensor values from sensors that are associated with the combine harvester during a training harvesting operation;

receive a target quality factor; and use a machine learning algorithm that has been trained by any residue collector disclosed herein, the received one or more sensor values and the target quality factor to determine and apply one or more calculated operational parameters to the combine harvester during the training harvesting operation.

The one or more operational parameters may comprise one or more operational parameters of a residue processing component of the combine harvester.

There is also disclosed a method comprising:

receiving residue directly from a combine harvester during a harvesting operation;

separating the residue into a first portion and a second portion based on a property of the residue;

directly or indirectly determining the weight of the first portion and the second portion; and determining a quality factor for the residue based on the determined weight of the first portion in relation to the weight of the second portion.

There is also disclosed a method of operating a combine harvester, the method comprising:

receiving one or more sensor values from sensors that are associated with the combine harvester during a harvesting operation;

using a machine learning algorithm that has been trained by any residue collector disclosed herein and the received one or more sensor values to determine a calculated quality factor; and presenting the calculated quality factor to an operator of the combine harvester during the harvesting operation or setting one or more operational parameters of the combine harvester during the harvesting operation based on the calculated quality factor.

There is also disclosed a method of operating a combine harvester, the method comprising:

receiving one or more sensor values from sensors that are associated with the combine harvester during a harvesting operation;

receiving a target quality factor; and using a machine learning algorithm that has been trained by any residue collector disclosed herein, the received one or more sensor values and the target quality factor to determine and apply one or more calculated operational parameters to the combine harvester during the harvesting operation.

There may be provided a computer program, which when run on a computer, causes the computer to configure any apparatus, including a controller or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION OF THE DRAWINGS

Figure 1:
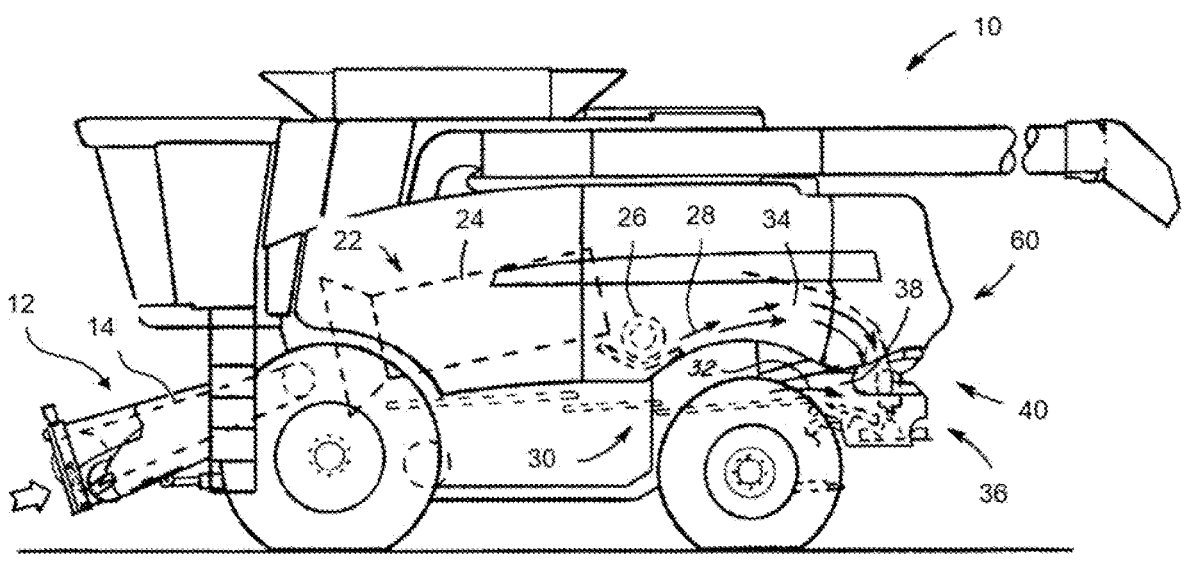
FIG. 1 shows a combine harvester.

FIG. 1 shows a combine harvester 10. The combine harvester 10 includes a feeder 12 onto which a header (not shown) can be mounted at a front end of the feeder. The header includes a cylindrical header reel (not shown) that rotates and directs crop material from growing crops to fall onto the header after/while being cut by the cutter bar of the header, allowing for the crop material to be separated from the growing crops and directed towards a crop elevator 14 in the feeder 12 that will supply the cut crop material to the other systems of the combine harvester 10.

The combine harvester 10 comprises a threshing system 22 arranged downstream of the feeder 14. The threshing system 22 includes a rotor 24 rotatable for separating grains from straw stalks and other plant residue, generally referred to as straw 28 or straw residue below, from the harvested crop.

The combine harvester 10 also includes a beater 26 rotatable for propelling a flow or stream of straw 28 rearwardly along an airborne trajectory through a rear cavity 34 enclosed by structural sheets of the combine harvester 10. Additionally, a chopper might be present to reduce average straw length.

The combine harvester 10 comprises a cleaning system 30 for receiving the grain of harvested crop from the threshing system 22 and removing chaff and any other remaining residue, including seed pods, husks, and the like, generally referred to as chaff 32 or chaff residue, from the grain and directing a flow or stream of chaff 32 rearwardly through a lower region of rear cavity 34, towards a lower opening 38.

A horizontal residue spreader assembly 36 is located in the rear cavity 34. The spreader assembly 36 comprises a crop residue distribution system 40, e.g. including two side-by-side spreader disks or impellers configured for rotation in opposite directions about generally vertical rotational axes. The crop residue distribution system 40 may also include pivotably supported deflector doors located at a rear end 60 of the rear cavity 34. The deflector doors may be pivotable between a closed position and an open position, to control spreading of the straw 28 and chaff 32, collectively referred to as crop residue, or simply residue (also known as "material other than grain" or MOG), behind the combine harvester 10.

The performance of a combine harvester can be measured by evaluating the grain loss.

For instance, the operator can stop the combine harvester and count the lost grains per unit of field area. It is also possible to put pans on the ground to collect the lost grains, and more accurately collect and count the lost grains.

However, not only the grain in the tank matters, but also the residue that the combine harvester leaves on the field. The residue is some or all of the harvest that passes through the combine harvester and does not go into the grain tank. As indicated above, this includes straw and chaff. Chaff/straw can also include plant material that is different from the crop, such as weeds and weed seeds.

After passing through the threshing and/or separation (which can include a rotor-concave, sieves, straw walkers, etc.), the operator can choose to deposit a certain fraction of the residue on the field, and optionally to process/treat it prior to depositing it on the field. For example, the operator can choose to deposit the straw directly as a swath, or to treat the straw before depositing it. For example, the straw can be treated by chopping it before depositing and/or spreading it in the field. The operator can choose to deposit the chaff directly, either together with the straw or separate from it (tram lining), or can choose to treat the chaff first and then deposit it. Possible treatments include mechanical treatment (like milling, grinding), chemical treatment (like mixing with a herbicide), radiation treatment and/or thermal treatment. One example of a mechanical treatment that will be discussed below is performed by a chaff mill, that can also be referred to as a weed seed destructor.

The operator can choose the treatment of the residue fraction prior to depositing it on the field to improve the field for subsequent agricultural operations and to improve future harvests. Chopping the straw can improve the use of the straw as fertilizer, by enabling faster breakdown. Treating the chaff can destroy weed seeds in the chaff and reduce the weed pressure.

The performance of the residue treatment is important to achieve good results and to reduce the requirement for (and therefore cost of) subsequent operations. Such subsequent operations can include the use of (extra) fertilizer, herbicide, irrigation, etc. Therefore, it can be important to evaluate the quality of the residue treatment. This can be done in a way that is similar to that for grain loss by stopping the combine harvester and manually checking the residue deposited in the field, or by collecting samples from the field for laboratory evaluation. However, this is very time consuming and it is difficult to get reliable quantitative results.

It is also difficult to relate residue quality measurements directly with specific parameters of the residue treatment system because the interaction can be quite complex. There are a big variety of harvesting situations, such as different crops, different status of the crop and different ambient conditions; it may not be self-evident which of these potential influences affects the measured quality of the crop residue.

Furthermore, it is also not recommended to rely (solely) on the know-how/experience of the operator of the combine harvester to be able to determine and adequately control the quality of the residue. This is because many operators are not (yet) very experienced in such matters and they are under a lot of time pressure at the time of the harvest.

Examples described below advantageously provide a better and more efficient device and method for quantifying the quality of residue that is deposited in the field. They can also enable much more data to be collected in different places and situations. Yet further, they can relate this data to settings of a residue treatment system of the combine harvester (or other parameters of the combine harvester) in an efficient and effective way that can be useful for subsequent harvesting operations.

Figure 2:
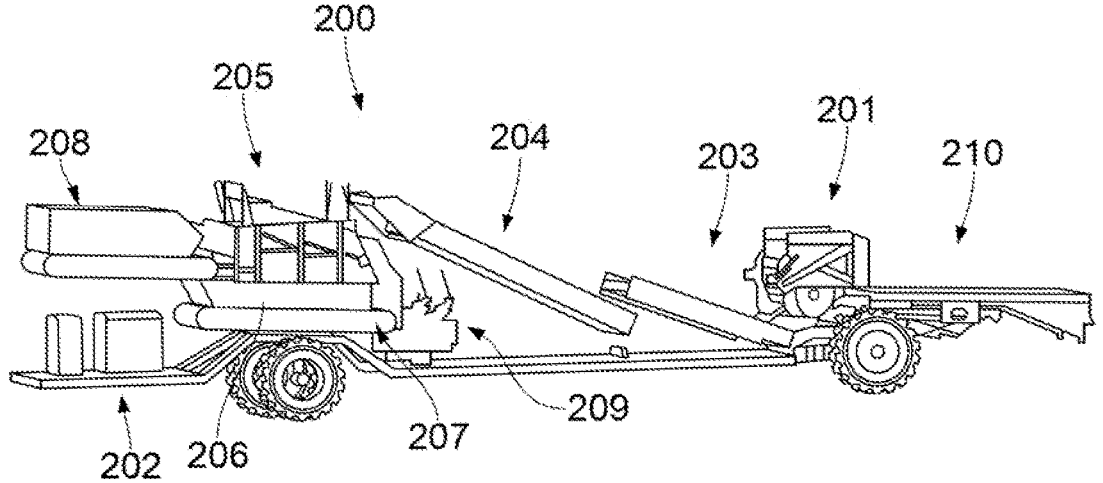
FIG. 2 illustrates an example of a residue collector.

FIG. 2 illustrates an example of a residue collector 200 according to an embodiment of the present disclosure. The residue collector 200 can quantify the quality of a residue stream that is received from a combine harvester 210 in the field by determining a quality factor for the residue. In FIG.

2, only part of the combine harvester 210 is shown in order to assist with the description of the residue collector 200; a rear portion of the combine harvester 210 is shown with most components (apart from the chopper 201) omitted.

The residue collector 200 receives residue directly from the combine harvester 210 during a harvesting operation. The residue may be processed residue in that it has been processed/treated by the combine harvester 210 (such as by a chopper 201) before it leaves the combine harvester 210. The residue stream can include one or more of: (unchopped) straw, chopped straw, (untreated) chaff, and treated chaff. As will be discussed in detail below, the residue collector 200 can be used during a training harvesting operation in order to calibrate a machine learning algorithm for the combine harvester 210 in order to achieve improved performance during subsequent (non-training) harvesting operations without the residue collector 200.

In the example of FIG. 2 the residue collector 200 is a trailer, which is pulled by the combine harvester 210 when in use. In other examples, the residue collector 200 can be self-propelled such that it is not mechanically coupled to the combine harvester 210, but instead can be operated such that it remains in close enough proximity to the combine harvester in order to directly receive the residue. In FIG. 2 the residue collector 200 is mechanically coupled to the combine harvester 210 by a tow hitch and also includes an engine 202. The engine 202 can be used to provide power for the residue collector 200, which may or may not be to provide propulsion to the residue collector 200. In this way, the residue collector 200 can be self-propelled and no power may be needed from the combine harvester 210. Drawing too much (or any) power from the combine harvester 210 could undesirably influence the measurements that are used to determine the quality factor.

A residue stream from the combine harvester 210 is transferred from the combine harvester 210 to the residue collector 200 by a transfer system. In the example of FIG. 2 the transfer system is a transfer belt 203. The chopper 201 of the combine harvester 210 deposits the residue stream onto the transfer belt 203, and the transfer belt 203 transfers the residue to downstream components of the residue collector 200. It will be appreciated that other transfer systems such as a hopper/accumulator, moving platform, etc. can be used. In this example, the transfer belt 203 is provided as part of the residue collector 200. The residue collector 200 also includes a total weight sensor 204 that receives residue from the transfer belt 203. The total weight sensor 204 includes its own transfer mechanism for transferring the residue to downstream components for processing.

In some examples, the residue collector 200 can be put in a residue collection configuration or a residue bypass configuration. This can be implemented by using a transfer system (the transfer belt 203 and/or the total weight sensor 204 in FIG. 2) that is movable between a residue collection position and a residue deposition position. Alternatively the hitch between the combine harvester 210 and the residue collector 200 can be extended to put the residue collector 200 in the residue bypass configuration, such that the residue does not reach the residue collector 200. In FIG. 2 the total weight sensor 204 is shown in a residue collection position, in that the total weight sensor 204 receives the residue and transfers it to downstream components such that the quality factor for the residue can be determined. In a residue deposition position, the residue collector 200 can deposit residue in the field without determining a quality factor for that residue. That is, the transfer system can direct the residue such that it bypasses or avoids at least some of the components of the residue collector 200 that determine the quality factor for the residue. By way of example, this can involve moving the total weight sensor 204 such that it provides residue to a spreader 209 instead of downstream components that are used to determine the quality factor. In FIG. 2, this involves the total weight sensor 204 being moved to the right such it receives residue from the transfer belt 203 and deposits the residue vertically downwards on to the spreader 209. That is, the leftmost end of the total weight sensor 204 is spaced apart (in a longitudinal direction) from a residue separator 205 such that the residue is not provided to the residue separator 205 from the total weight sensor 204. Alternatively, the transfer belt 203 can be rotated about a vertical axis such that the residue is deposited to the side of the residue collector 200 or it can involve moving the transfer system such that it does not receive the residue.

Beneficially, in some examples, the transfer system can be suitable for transferring residue streams from different types and models of combine harvesters such that the residue collector 200 can be used with a variety of combine harvesters.

In the example of FIG. 2, the total weight sensor 204 determines the weight of the received residue. The total weight sensor 204 receives the residue from the transfer belt 203 and is implemented as a weight measuring belt/conveyor in this example. The total weight sensor 204 can periodically provide a total-weight-signal to a controller (not shown), wherein the total-weight-signal represents the weight of the residue that is received from the combine harvester 210, and for which the quality factor will be determined. During a training harvesting operation, the combine harvester can provide residue to the residue collector 200, with the residue collector 200 in the residue bypass configuration. As discussed above, this can involve putting the total weight sensor 204 in the residue deposition position such that it provides residue to the spreader 209.

Once the training harvesting operation is considered to represent stable operation, and the total weight sensor 204 is receiving a consistent amount of residue from the combine harvester, the combine harvester and the residue collector 200 can be stopped and the transfer mechanism of the total weight sensor 204 can be paused such that it is loaded with residue.

While the combine harvester and the residue collector 200 are stationary, the residue collector 200 can be put in the residue collection configuration. As discussed above, in FIG. 2 this can involve putting the total weight sensor 204 in a residue collection position such that it provides all of the residue that is on the total weight sensor 204 to the residue separator 205.

The residue separator 205 separates the processed residue into a first portion and a second portion based on a property of the processed residue. In this way, the residue separator 205 splits the residue stream into at least two fractions with different properties.

The residue separator 205 in this example is provided as a sieve 206 such that relatively small elements of the residue can pass through the sieve, but relatively large elements cannot. That is, the property of the residue that is used to separate the received residue into the first portion and the second portion includes the size of the residue. For example, short straw can be separated from long straw. The residue separator 205 can include various adjustable settings such as: adjustable shaking rpm (revolutions per minute) to shake the sieve 206 and facilitate the smaller elements of the residue passing through the sieve 206; an adjustable shaking stroke, again to shake the sieve 206 and facilitate the smaller elements of the residue passing through the sieve 206; and adjustable sieve openings to set the size of residue elements that are able to pass through the sieve 206, and what size are not.

In this example, the elements of the residue that pass through the sieve 206 (and therefore are relatively small) can be considered as a first portion of the received residue. The elements of the residue that do not pass through the sieve 206 (and therefore are relatively large) can be considered as a second portion of the received residue.

The residue collector 200 further includes a first portion weight sensor 207 that determines the weight of the first portion of the received residue (the portion that passes through the sieve 206). The residue collector 200 also includes a second portion weight sensor 208 that determines the weight of the second portion of the received residue (the portion that does not pass through the sieve 206). The first portion weight sensor 207 can provide a first-portion-weight-signal to a controller (not shown), wherein the first-portion-weight-signal represents the weight of the first portion of the residue that was present on the total weight sensor 204 when the machines were stopped. The second portion weight sensor 208 can provide a second-portion-weight-signal to a controller (not shown), wherein the second-portion-weight-signal represents the weight of the second portion of the residue that was present on the total weight sensor 204 when the machines were stopped.

In this example it can be advantageous to stop the machines to weigh the first and second portions because more accurate measurements can be taken. In other examples, sufficiently accurate measurements are achievable while the machines are in motion. That is, it is not necessary to stop the combine harvester 210 and the residue collector 200 once the training harvesting operation is considered to represent stable operation. Instead, the residue collector 200 can be put in the residue collection configuration while it is in motion and the reside can be separated and weighed without stopping the residue collector 200. In this way, the residue collector 200 can also work in a continuous mode in which it performs the measuring on a continuous stream of residue coming from the combine harvester 210 without the combine harvester 210/residue collector 200 stopping in the field. In some examples this can involve processing only a portion of the residue flow, especially if the residue collector 200 has capacity limitations, this might probably require to monitor only a fraction of the residue flow. This can be implemented by alternating the residue collector 200 between the residue collection configuration and the residue bypass configuration such that an appropriate amount of residue is processed by the residue collector 200. Alternatively, only a fraction of the residue may be processed by the residue collector 200 when it is in the residue collection configuration.

One or both of the first portion weight sensor 207 and the second portion weight sensor 208 can be implemented as a weight measuring belt/conveyor in the same way as the total weight sensor 204. Alternatively, any of the weight sensors described herein can be implemented by accumulating residue in a weighing bunker for a predetermined period of time or in any other way that is known in the art.

Once the first portion has been weighed, in the example of FIG. 2 it is provided to the spreader 209 for depositing on the field. Optionally, the second portion can also be provided to the spreader 209 after it has been weighed.

The residue collector 200 also includes a controller (not shown) for processing one or more of the total-weight-signal, the first-portion-weight-signal and the second-portion-weight-signal. The controller can be provided locally to, or remote from, the residue collector 200. For example, the functionality of the controller can be provided in the cloud and the weight-signals that are measured by weight sensors 204, 207, 208 can be transmitted to the remote controller for processing.

The controller determines a quality factor for the processed residue based on the determined weight of the first portion in relation to the weight of the second portion. In this way the controller can determine the quality factor during the harvesting operation because the signals that are required to determine the quality factor are available nearly instantaneously during the harvesting operation. It will be appreciated that calculating a quality factor in this way can implemented by processing any 2 of the following 3 signals: the total-weight-signal, the first-portion-weight-signal and the second-portion-weight-signal. Therefore, in some examples only 2 of the following 3 weight sensors may be required: the total weight sensor 204, the first portion weight sensor 207 and the second portion weight sensor 208. That is, the residue collector 200 can include one or more weight sensors (since a weight sensor can potentially be reused such that it provides more than one of the weight-signals) for directly or indirectly determining the weight of the first portion and the second portion. An example of an indirect determination of the weight of the first portion can be made by subtracting the second-portion-weight signal (as provided by the second portion weight sensor) from the total-weight-signal (as provided by the total weight sensor).

In the example of FIG. 2 the quality factor is calculated by dividing the first-portion-weight-signal by the total-weight-signal. In this way, it represents the proportion of the received residue that passes through the sieve 206 and therefore is classified as relatively small. It will be appreciated that the same general information can be determined by performing appropriate calculations with any 2 of the weight-signals.

Furthermore, the controller can provide an indicator of the determined quality factor to an operator of the combine harvester during the harvesting operation. For example, by displaying the determined quality factor on a screen in the cab of the combine harvester. Furthermore, the controller can periodically update the quality factor as updated weight-signals are received and processed.

In some examples the residue collector 200 can include a residue selection component that selectively transfers only part of the received residue stream to the residue separator 205. This selection can be based on a lateral position of the received residue (for example to select residue over only part of the width of the received reside, such as only the left part of the residue that is coming out of the combine harvester). Additionally or alternatively, the selection can be based on time (for example, residue is transferred to the residue separator 205 for half a minute of every 5 minutes). Such selection can be beneficial because it can match the rate at which the combine harvester 210 produces the residue with the capacity of the residue collector 200. The parts of the residue that are not selected for processing by the residue separator 205 can be deposited directly on the field.

In yet another example, the residue collector 200 can include a residue scanner (not shown) that scans the residue that is received from the combine harvester 210 to determine the volume of residue that is being provided per unit time. In this way, the flow rate of residue that is provided by the combine harvester 210 can be determined. Such a residue scanner can be implemented with an ultrasonic sensing system, a lidar sensing system or a radar sensing system, as non-limiting examples. The controller can then be used to determine the volume of residue that is being provided to automatically control one or more operational parameters of the combine harvester 210 and/or the residue collector 200. For instance, an operational parameter of the combine harvester 210 can be set such that the volume of residue that is being provided by the combine harvester 210 is a better match for the volume of residue that can be handled by the residue collector 200 without overloading or underloading it. Also, an operational parameter of the residue collector 200 can be set so as to selectively switch between a residue collection configuration and a residue bypass configuration such that the volume of residue that is provided to the residue separator 205 is a better match for the volume of residue that can be handled by the residue separator 205. Further still, an operational parameter of the residue collector 200 can be set so as to control a residue selection component that selectively transfers only part of the received residue stream to the residue separator 205.

The residue collector 200 of FIG. 2 can provide very significant advantages. By combining the collection of the residue with the determination of the quality factor for the residue on a single device (the residue collector 200), it is possible to complete a training harvesting operation quickly and efficiently. This can provide a drastic reduction in time and cost for testing. Furthermore, because the testing can be performed more quickly, there will also be less variation in the test results as crop and field conditions will not change significantly during the time it takes to perform a training harvesting operation. This is especially beneficial when performing training harvesting operations to build up a dataset that will used to improve the performance of a subsequent (non-training) harvesting operation. This is discussed in detail below in relation to acquiring training data for a machine learning algorithm that will be implemented as part of the subsequent (non-training) harvesting operation.

In examples where the controller is used to train a machine learning algorithm, it can also receive one or more sensor values from sensors that are associated with the combine harvester 210 during the training harvesting operations. In some examples, the one or more sensor values are from sensors that are associated with residue processing components of the combine harvester 210, which are used to process/treat the residue before it is ejected from the combine harvester 210. The sensor values can be associated with a determined quality factor, in that they are recorded at a time that corresponds to substantially the same elements of the residue for which the quality factor will be determined. For instance, the controller can apply a time offset to the one or more sensor values to account for the time it takes the residue stream to travel from: i) the point in/at the combine harvester from which the sensor values were recorded; to ii) the point/points in the residue collector 200 from which measurements are taken to determine the quality factor. In alternative examples the controller may not apply a time offset. This is on the basis that variations in the residue are considered to be relatively slow compared to the time it takes for the residue to pass through the combine harvester 210 and the residue collector 200.

The controller can then train the machine learning algorithm based on the one or more sensor values and the determined quality factor. For example, the machine learning algorithm can be a classification algorithm that uses the one or more sensor values as inputs and the determined quality factor as ground truth data for the training. The trained machine learning algorithm can then be used during a subsequent harvesting operation to process received sensor values and determine a quality factor, without requiring use of a residue collector 200. In this way, the residue collector 200 can be used for obtaining training data for calibrating the machine learning algorithm.

The types of machine learning algorithm that are suitable for providing this functionality are well known in the art and can include a neural network (NN), a convolutional neural network (CNN) and a state vector machine (SVM), as non-limiting examples.

Examples of sensors that can be used to provide the sensor values include optical sensors, cameras, acoustic sensors, temperature sensors, velocity or rpm sensors, pressure sensors, moisture sensors, loss sensors, knock sensors, and mechanical sensors. Indeed, any sensor can be used that can sense data that can have an effect on the quality of the residue (as it is defined by the quality factor).

In further detail, the one or more sensors can include a camera (or other optical sensor) that records images of the crop or residue and/or a crop flow path or residue flow path in the combine harvester 210. The sensor values can therefore comprise one or a series of pictures taken from the residue stream within the combine harvester, such as pictures from a so-called chop cam that records images of chopped straw in/at the combine harvester 210.

If the one or more sensors includes one or more acoustic sensors, then these can be located to record sounds of the crop/residue as it passes along a flow path in the combine harvester 210. One or more of the size, shape and material of the crop/residue can affect the sounds that occur as the crop/residue passes through the combine harvester 210, and therefore the recorded sounds can be indicative of the quality factor of the residue.

If the one or more sensors includes one or more mechanical sensors, then these can be located to record impacts/vibrations caused by the crop/residue as it passes along a flow path in the combine harvester 210. One or more of the size, shape and material of the crop/residue can cause different mechanical sensor values as the crop/residue passes through the combine harvester 210, and therefore the recorded mechanical sensor values can also be indicative of the quality factor of the residue.

Loss sensors are known in the art as being capable of sensing an amount of grain that is not successfully recovered by the combine harvester 210, and therefore is lost. Such loss sensors can include an optical sensor, an acoustic sensor and a knock sensor. A knock sensor can be excited by grain impacting it.

Optionally, well-known signal processing techniques can be applied to the sensor values before they are used by the controller to train the machine learning algorithm. Such techniques include calibration, noise reduction, low pass filtering, etc. In the case of one or more images, well-known image processing techniques can be applied such as calibration, noise reduction, thresholding, edge and shape recognition, classification and counting.

Advantageously, the calculation (and optional display) of the residue quality factor during the training harvesting operation enables the operation of the combine harvester 210 to be adjusted during the training harvesting operation in order to create a varied dataset for training the machine learning algorithm. For instance, one or more operational parameters of the combine harvester 210 can be adjusted such that different measurements for the sensor values are obtained and/or different quality factors are determined. In this way, a good set of training data can be acquired for the machine learning algorithm in a fast and efficient way. This can be much better than an example where a quality factor of the residue is calculated after the training harvesting operation is complete, in which case it will likely be necessary to initiate another training harvesting operation to try and complete the dataset. Even then, that subsequent training harvesting operation may not provide all of the required information because it will be difficult for the operator to know the quality of the residue that is being produced. Yet further, it can be more difficult to accurately associate any sensor values with determined quality factors when the quality factors are determined from residue that is collected and processed separately.

Returning to FIG. 1, we will now describe how a machine learning algorithm that has been trained by the method described above can be used by the combine harvester 10 to provide residue that has a desired quality factor. It will be appreciated by those skilled in the art that the desirability of a specific quality factor for the residue will depend upon the specifics of the harvesting operation. For instance, for a harvesting operation in a tropical country (such as Brazil), it may be desirable to have relatively large residue left on the ground after the harvesting operation in order to protect the topsoil from tropical rain. Whereas in a country that is relatively cold (such as Canada) it may be desirable to have relatively small residue left on the soil so that it can more easily be broken down. This potential range in values for what is considered a desirable quality factor is one reason that it can be advantageous to use a varied dataset when training the machine learning algorithm, as discussed above.

The combine harvester 10 that is to be used for the (non-training) harvesting operation includes a controller (not shown). The controller receives one or more sensor values from sensors that are associated with the combine harvester during the harvesting operation. The sensors and sensor values can be any of the corresponding sensors and sensor values that are discussed above in relation to training the machine learning algorithm.

The controller can then use the machine learning algorithm that has been trained by the method that is described above, with the received one or more sensor values as inputs, to determine a calculated quality factor. The quality factor can be calculated nearly instantaneously as the residue is being generated by the combine harvester 10.

In this example, the controller also causes the calculated quality factor to be presented to an operator of the combine harvester 10 during the harvesting operation. In this way, a live feed of the instantaneous values of the calculated quality factor can be presented to the operator such that the operator can continue to use the combine harvester 10 in an improved way. For instance, if the operator can see that the calculated quality factor is too low or too high (when compared with their desired quality factor) then they can adjust an operating parameter of the combine harvester 10 to bring the calculated quality factor closer to the desired values. (An example of how an operating parameter of the combine harvester 10 can be adjusted by changing the performance of the chopper is described below.) The controller can cause the calculated quality factor to be presented to the operator visually (through use of a display in the cab, for example), aurally (through use of a speaker, for example) or by any other way that is known in the art.

Additionally or alternatively, the controller may set one or more operational parameters of the combine harvester 10 during the harvesting operation based on the calculated quality factor. This can be implemented by applying a control loop that adjusts the one or more operational parameters with a view to bringing the calculated quality factor closer to a target quality factor that has been provided to the controller by an operator of the combine harvester 10. Such control loops are known in the art and can involve adjusting the one or more operational parameters until the calculated quality factor is considered close enough to the target quality factor or until further iterations of the control loop do not result in a significant enough improvement in the calculated quality factor. In this way, the controller can set one or more operational parameters of the combine harvester during the harvesting operation based on the calculated quality factor and also based on a target quality factor (or a range of target quality factors if that is what has been provided).

In a yet further example, a controller associated with the residue collector can train a machine learning algorithm in a different way during a training harvesting operation. In such an example the controller receives one or more sensor values and one or more operational parameters of the combine harvester during the training harvesting operation, in addition to the determined quality factor. In the same way that is described above, the one or more sensor values are from one or more of a variety of sensors that are associated with the combine harvester. The one or more operational parameters of the combine harvester can be associated with the determined quality factor, in that they are recorded at a time that corresponds to substantially the same elements of the residue for which the quality factor has been determined. In the same way that is described above for the sensor values, the controller may or may not apply a time offset to the one or more operational parameters to account for the time it takes the residue stream to travel from: i) the point in/at the combine harvester at which an operational parameter takes effect; to ii) the point/points in the residue collector from which measurements are taken to determine the quality factor.

The operational parameters of the combine harvester can include operational parameters of residue processing components of the combine harvester, such as an operational parameter of a chopper that chops the residue before it exits the combine harvester. Further details of such an example are provided below with reference to FIG. 5.

In this way, a dataset can be created whereby data of the working condition of the combine harvester and data measured in the combine harvester is combined with data measured by the residue collector (optionally shifted over time).

The controller associated with the residue collector can then train the machine learning algorithm based on the one or more sensor values, the one or more operational parameters and the determined quality factor. For example, the machine learning algorithm can be a classification algorithm that uses the one or more sensor values and the determined quality factor as inputs, and uses the one or more operational parameters as ground truth data for the training. As will be discussed below, a machine training algorithm that is trained in this way is one way of providing for autonomous control of (at least some aspects of) a harvesting operation.

With reference to FIG. 1, we will now describe how a machine learning algorithm that has been trained by the method described above can be used by the combine harvester 10 to provide residue that has a desired quality factor.

In this example the controller of the combine harvester 10 that is to be used for the (non-training) harvesting operation receives: one or more sensor values from sensors that are associated with the combine harvester during the harvesting operation; and a target quality factor (e.g. as provided by an operator of the combine harvester 10 as discussed above). Again, the sensors and sensor values can be any of the corresponding sensors and sensor values that are discussed above in relation to training the machine learning algorithm.

The controller can then use the machine learning algorithm that has been trained by the method that is described above, with the received one or more sensor values and the target quality factor as inputs, to determine and apply one or more calculated operational parameters for the combine harvester during the harvesting operation. In this way, at least part of the combine harvester can be automatically controlled such that it provides residue with a desired quality factor.

It will be appreciated from the above description that by running field tests with a residue collector with a variety of combine harvester and residue treatment settings, a sufficiently broad and large dataset can be created to enable a well-known artificial intelligence (AI) algorithm to be trained such that the combine harvester and residue treatment settings can be controlled for a subsequent harvesting operation to obtain a desired residue quality in a range of conditions.

In a further example, any of the machine learning algorithms described herein can be trained with additional types of data, including crop-data, field-data and/or environmental-data, as inputs that are acquired during the training harvesting operation. Similarly, when the trained machine learning algorithm is used in a subsequent (non-training) harvesting operation, the same additional types of data can be acquired and used as inputs.

Crop-data is indicative of one or more characteristics of the crop in the field that is to be harvested by the combine harvester. The crop-data may be indicative of one or more of:

crop height;

crop density;

crop moisture;

crop feed rate (i.e. how much crop is entering the machine); and crop type.

Field-data is indicative of a field condition of a field across which the combine harvester is operating. The field-data may be indicative of one or more of:

a moisture content of the soil;

a temperature of the soil; and a soil type.

Environmental-data is indicative of the environmental conditions in which the combine harvester is operating. The environmental-data is indicative one or more of:

air humidity; and air temperature.

Various types of sensor that are suitable for providing the above types of data are well-known in the art.

As discussed above, a residue collector as described herein includes a residue separator for separating residue into a first portion and a second portion based on a property of the residue. In the example of FIG. 2, the residue separator is implemented as a sieve. In another example the residue separator can include a fan/blower that provides an airflow to the residue. Such an airflow can cause a first portion of the residue to be transported along a first flow path (such as into a first bin/hopper), and can also cause a second portion of the residue to be transported along a second flow path (such as into a second bin/hopper). It will be appreciated that the weight and/or dimensions of the individual elements of the residue will determine how much affect the airflow will have on those elements and therefore whether the airflow will cause them to be transported along the first or the second path. Such a residue separator can cause the residue to be separated into the first portion and the second portion based on the weight and/or dimensions of the residue.

It will also be appreciated that the residue separator can separate the received residue into more than two portions (for example by sequentially passing the residue through a plurality of sieves each with smaller holes than the preceding one), and that a corresponding quality factor can be determined accordingly. For such an example, the quality factor can consist of a plurality of different sub-components which each represent a different portion. As a numerical example: if a first portion includes 50% of the total weight of the received residue, a second portion includes 30% of the total weight of the received residue, and a third portion includes 20% of the total weight of the received residue, then the quality factor can be represented as 50.30.20. That is, the quality factor for the processed residue can be determined based on the relative weights of three or more portions.

In another example, the residue separator for separating the residue can include a camera that records images of the residue. The residue separator can also include an image processing algorithm that extracts one or more features from the images. These extracted features are examples of properties of the residue that can be used to separate the residue into the first portion and the second portion. Non-limiting examples of features that can be extracted from such images include:

the size of elements within the residue, such as:
a distinction between short and long straw (e.g. with respect to one or more threshold values);
a distinction between large and small grains/particles of processed chaff (again, with respect to one or more threshold values for example). Such an example can be particularly useful in an example that includes a chaff mill to treat the residue before it is ejected by the combine harvester. The chaff mill can also be referred to as a weed seed destructor, in that it is used to destroy weed seeds, and therefore reduce their germination capacity, before they are returned to the field as residue. Therefore, being able to distinguish been large and small particles in the residue (and therefore the extent to which weed seeds have been destroyed) can enable a useful quality factor to be determined;
colour;
for example, the amount of one or more specific colours in an image of the residue can be indicative of one or more properties of the residue. Such as: the amount of green in an image can be indicative of the amount of weeds; the amount of brown in an image can be indicative of the amount of grain; the proportion of green pixels to brown pixels can be indicative of the proportion of weeds to grains in the residue;
the number of predetermined shapes in the image, e.g. shapes that represent damaged seeds or grain, spliced straw or, more generally the condition of straw: e.g. bent, buckled, dented, crushed, etc.

In a yet further example, the residue separator can separate the residue into the first portion and the second portion based on a moisture content of the residue. The residue separator can include a moisture sensor that determines the moisture of the residue, and can include a controller that compares a sensed moisture value with one or more thresholds to determine whether the associated residue should be part of the first portion or the second portion.

For at least some of the above properties that are used to determine whether the residue should be in the first portion or the second portion (or any further portions if there are any), the residue separator can include a separation mechanism for dividing the residue into the different portions. In one example implementation, the residue can be transported on a conveyor belt towards a movable panel that can divert the residue to either a first bin/hopper or to a second bin/hopper. The position of the movable panel is set based on the determined property of the residue such that the residue can be selectively directed to one of the bins/hoppers and therefore separated into the different portions.

With reference to FIG. 1, and as indicated above, in some examples the combine harvester 10 can produce chaff residue 32. Such chaff residue 32 can be treated within the combine harvester 10 by mechanical processing, such as by a mill to destroy weed seeds. For such an example, a residue collector can separate the treated chaff residue into two portions, for example based on grain/particle size. For example, to separate chaff residue treated by grinding into a fraction with bigger particles, such as weed seeds and/or broken weed seed particles, and a fraction with smaller particles, such as crushed chaff and dust. By quantifying the weed seed (particles) with a size above a certain threshold, a quality indicator for the chaff treatment, in particular mechanical treatment, for example grinding or milling, can be evaluated. The residue collector can have a residue separator that includes a raking system, typically suitable for processing straw-like residue.

Figure 3:
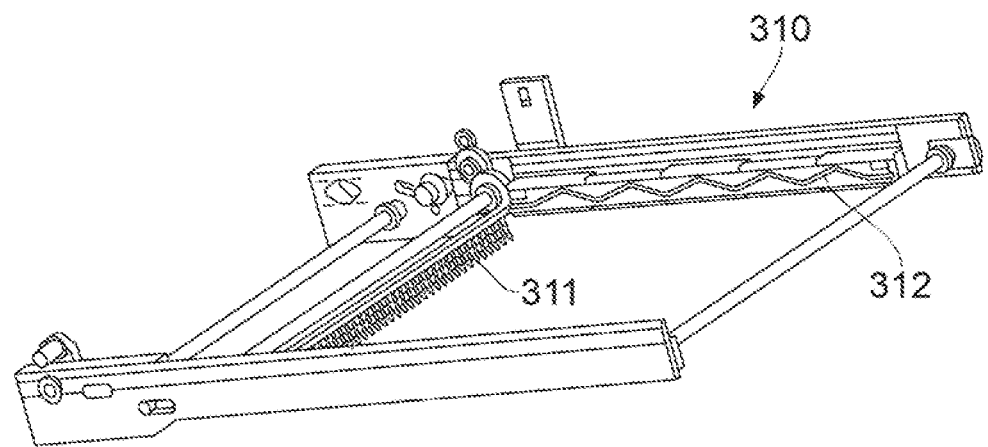
FIG. 3 shows an example embodiment of a raking system that can be provided as part of a residue separator.

FIG. 3 shows an example embodiment of a raking system 310 that can be provided as part of a residue separator according to the present disclosure. The raking system 310 can be positioned on top of the sieves (not shown in FIG. 3). The raking system 310 assists in spreading the residue/straw over the sieves and can help prevent blockages in the sieves.

In the example of FIG. 3, the raking system 310 includes a rake 311 with a plurality of tines. The rake 311 is operable to be moved parallel to the sieve with a superimposed up/down movement (for instance, in a wave-like motion). This is implemented in FIG. 3 by the undulating tracks 312 in which the rake 311 is mounted. As the rake 311 is moved in a longitudinal direction along the sieves, the undulating tracks 312 cause the rake 311 to also move up and down in a direction that is perpendicular to the plane of the sieve. The wave-like motion can be used for the back and forth motion (such that the rake 311 follows the undulating tracks when it moves in both longitudinal directions over the sieves). Alternatively, the rake 311 may move in the wave-like motion in only one longitudinal direction, while in the other longitudinal direction the rake 311 is returned while not raking the straw, for example it is returned above the straw. This can be implemented by the rake 311 following the wave-like track 312 in one longitudinal direction, and following a different track (that is further spaced apart from the sieve) in the other longitudinal direction. As a further still example, the raking system 310 can alter the wave pattern that the rake 311 follows (in terms of phase and/or amplitude) by any suitable mechanism. This can further assist in separating the residue into the different portions.

As indicated above, and as illustrated in FIG. 2, the residue collector 200 can have an additional power source on board, such as a combustion engine 202, electric motor with battery and/or fuel cell. Such a power source can be used to drive the residue separator. This can be in addition to, or instead of, providing propulsion for the residue collector 200. This can be advantageous because no power is needed from the combine harvester for driving the residue separator, which could undesirably influence the measurements.

Figure 4:
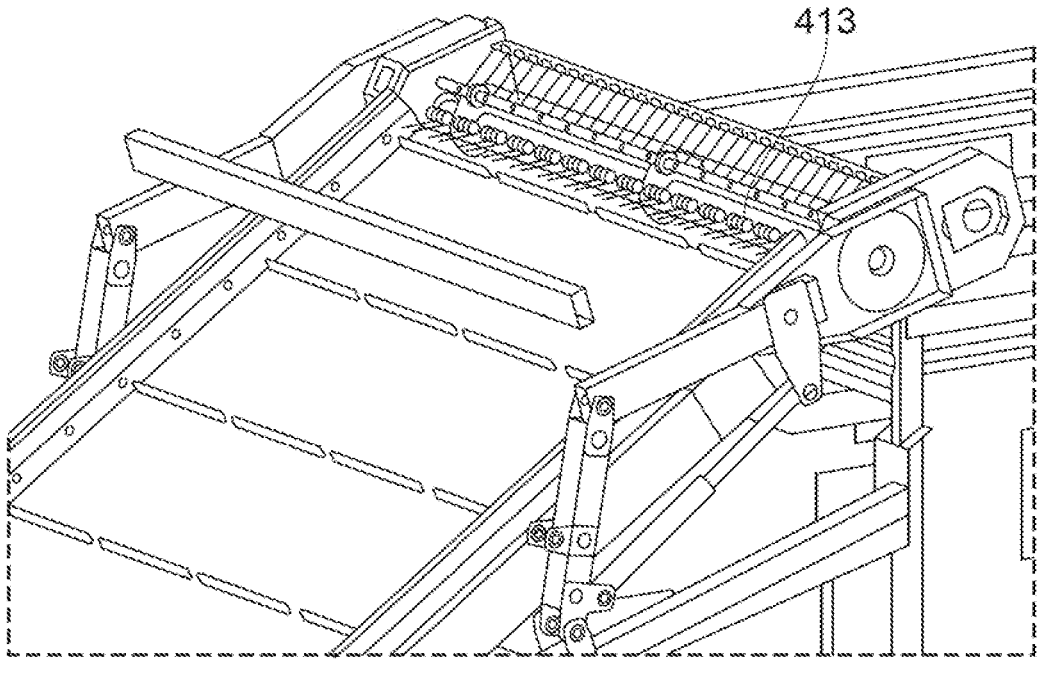
FIG. 4 shows an example of a rotating shaft for facilitating the transition of crop residue from one belt to another belt in a residue collector.

Again with reference to FIG. 2, to facilitate the transition from one belt to another belt (for example from the transfer belt 203 to the weight measuring belt of the total weight sensor 204), the residue collector 200 can include a rotating shaft with tines that engage with the residue as it moves between the two belts. FIG. 4 shows an example of such a rotating shaft 413. This can improve the homogeneity of the feeding of the residue and assist with ensuring a continuous flow of the residue.

Figure 5:
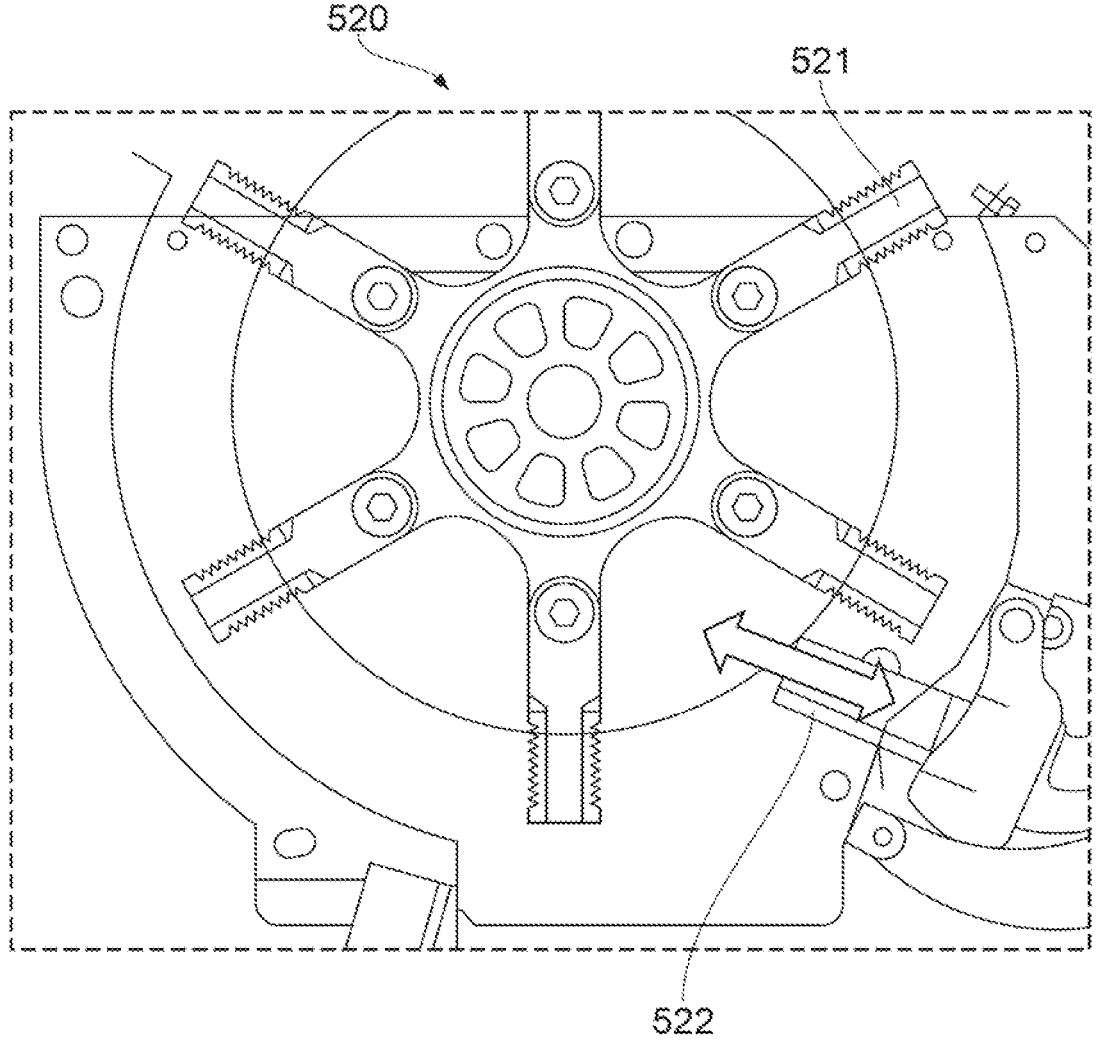
FIG. 5 shows further details of a chopper, which is an example of a component that can process crop residue before it is ejected from the combine harvester.

FIG. 5 shows further details of a chopper 520, which is an example of a component that can process the residue before it is ejected from the combine harvester as part of a harvesting operation. The chopper 520 includes a plurality of rotational knives/blades 521 that rotate about an axis and periodically come into close proximity with a stationary/counter knife 522. Any residue that is between a rotational knife 521 and the stationary knife 522 when they pass each other is cut.

As discussed above, one or more operational parameters of a combine harvester can be adjusted with a view to changing the quality factor of the residue that is ejected by the combine harvester. One or more operational parameters of the chopper 520 are examples of operational parameters of the combine harvester that can be set to adjust the quality factor. Especially if the quality factor is, or is representative of, the size of elements in the residue. Such operational parameters can include the speed of the chopper (i.e. the speed with which the rotational knives 521 are rotated) and the position of the stationary knife 522. As shown schematically in FIG. 5 the stationary knife 522 can be inserted or retracted to adjust the amount that it overlaps with the rotational knives 521 as they rotate. Further still, the angle of the stationary knife 522 can be adjusted to change the performance of the chopper 520.

Other examples of operational parameters of the combine harvester that can be adjusted with a view to changing the quality factor of the residue include:

the speed with which residue passes through the chopper 520. In one example, this can be adjusted by setting the position of a shred bar. The shred bar can be inserted into, or retracted from, the residue flow path through the chopper 520 in order to selectively impede the residue flow. By slowing the residue flow through the chopper 520 it can be cut more times and therefore be made smaller than if its flow through the copper 520 were impeded less.

aggressivity of the threshing system before the chopper. For example, the rotor speed can be adjusted and/or an operational property of the concaves. As a further example, the angle of the rotor vanes can be adjusted to change the aggressivity of the threshing system. As a general statement, the longer the residue is in the threshing system, the more damaged it is likely to be.

feed rate of residue into the chopper 520, which in one example can be adjusted by changing the speed of the combine harvester.

Figure 6:
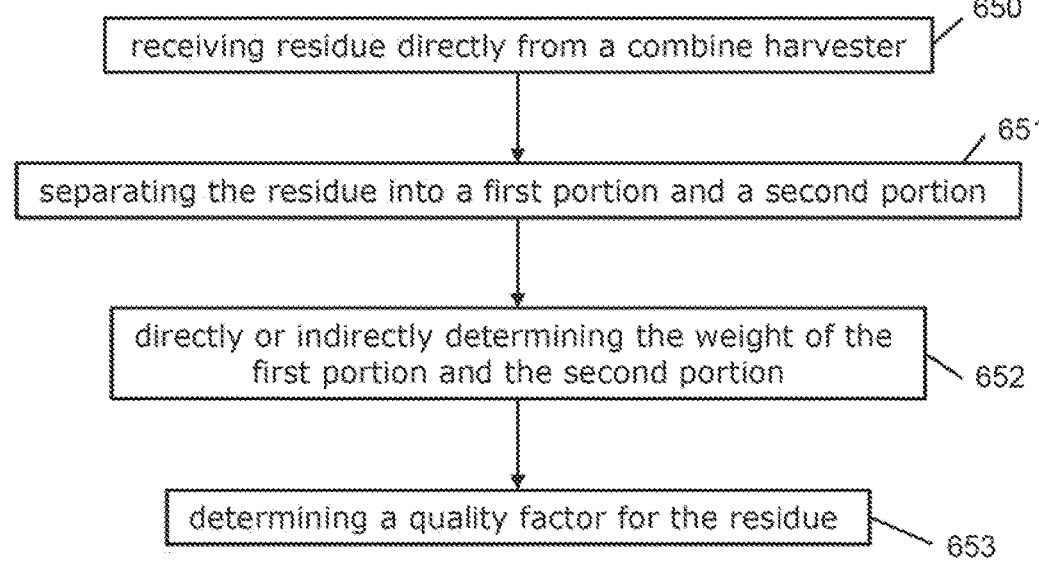
FIG. 6 shows an example embodiment of a method of determining a quality factor for residue that is ejected by a combine harvester.

FIG. 6 shows an example embodiment of a method of determining a quality factor for residue that is ejected by a combine harvester. The method can be performed by any of the residue collectors described herein.

At step 650, the method receives residue directly from a combine harvester during a training harvesting operation. The residue is directly received such that the subsequent processing steps can also be performed during the training harvesting operation. That is, without the combine harvester, the residue collector or the residue itself having to be moved away from the position at which the residue was collected.

At step 651, the method separates the residue into a first portion and a second portion based on a property of the residue. At step 652, the method directly or indirectly determines the weight of the first portion and the second portion. Numerous examples of how these steps can be performed are discussed above.

Figure 7:
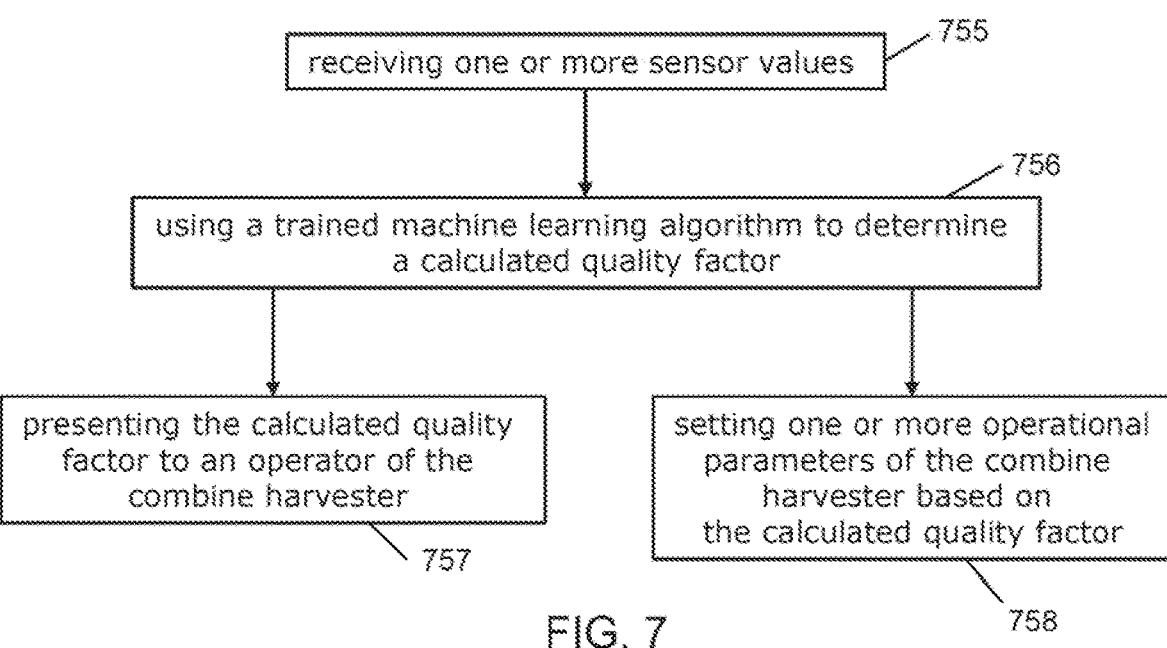
FIG. 7 illustrates a method of operating a combine harvester.

At step 653, the method determines a quality factor for the residue based on the determined weight of the first portion in relation to the weight of the second portion. In this way, the quality factor can be determined and updated on-the-fly, during the training harvesting operation FIG. 7 illustrates a method of operating a combine harvester. The method is computer-implemented and can be performed by any of the controllers described herein.

At step 755, the method receives one or more sensor values from sensors that are associated with the combine harvester during a harvesting operation. Various examples of such sensors are described above, and can include any sensor that measures a value that can affect a quality factor of the residue that is ejected by the combine harvester.

At step 756, the method uses a machine learning algorithm that has been trained by a dataset at least partially collected by a residue collector as described above. More particularly, a machine learning algorithm that has been trained with one or more sensor values as inputs and a determined quality factor as ground truth output data. At step 756, the method applies the received one or more sensor values as inputs to the trained machine learning algorithm to determine a calculated quality factor.

After step 756, the method can perform step 757 and/or step 758. At step 757, the method presents the calculated quality factor to an operator of the combine harvester during the harvesting operation. This can enable the operator to manually adjust the operation of the combine harvester based on the calculated quality factor, which would otherwise be difficult or impossible for the operator to discern during the harvesting operation. At step 758, the method sets one or more operational parameters of the combine harvester during the harvesting operation based on the calculated quality factor, thereby providing at least an element of autonomous control.

Additionally, the calculated quality factor can be stored, preferably in combination with the location and/or date plus time. A map of the calculated quality factor can be created to be used as an input for subsequent agricultural operations on that location.

Figure 8:
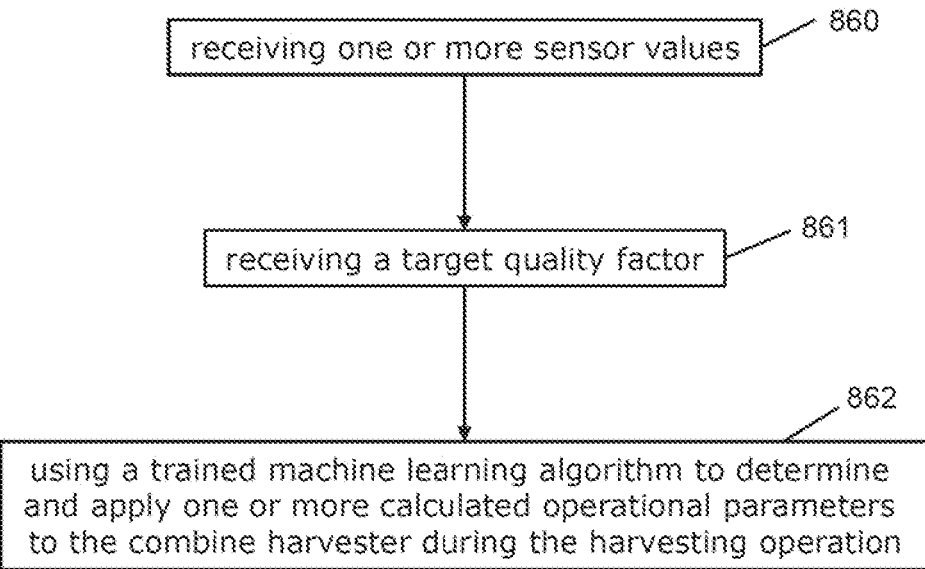
FIG. 8 illustrates another method of operating a combine harvester.

FIG. 8 illustrates another method of operating a combine harvester. As with FIG. 7, the method of FIG. 8 is computer-implemented and can be performed by any of the controllers described herein.

At step 860, the method receives one or more sensor values from sensors that are associated with the combine harvester during a harvesting operation. At step 861, the method receives a target quality factor. The target quality factor represents a desired value for the quality factor of the residue, and can be set by an operator of the combine harvester. In some examples, the target quality factor can be implemented as a range of quality factor values.

At step 862, the method using a machine learning algorithm that has been trained by a residue collector as described above. More particularly, a machine learning algorithm that has been trained with one or more sensor values and a determined quality factor as inputs and one or more operational parameters as ground trust output data. At step 862, the method applies the received one or more sensor values and the received target quality factor as inputs to the trained machine learning algorithm to determine (and then apply) one or more calculated operational parameters to the combine harvester during the harvesting operation. In this way, at least an element of autonomous control can be provided.

Examples disclosed herein can relate to a method of quantifying the quality of a residue stream of a combine harvester on the field that comprises:

a residue collector following the combine harvester closely over the field during the harvesting test;

(at least part of) a residue stream of the combine harvester being transferred to the residue collector;

the weight of the residue stream being determined;

the residue stream being split into at least two fractions with different properties;

the weight of at least one separated residue stream fraction being measured;

optionally also measuring other properties of the residue stream; and depositing the residue stream fraction onto the field.

What is claimed is:

1. A residue collector that is separate from a combine harvester and operable to receive processed residue expelled from the combine harvester during a training harvesting operation, wherein the residue collector comprises:

a transfer system for transferring the processed residue expelled from the combine harvester to a residue separator of the residue collector, the residue separator being configured for receiving the processed residue received from the transfer system and separating the processed residue into a first portion and a second portion based on a property of the processed residue;

one or more weight sensors for directly or indirectly determining a weight of the first portion and the second portion; and a controller configured to determine a quality factor for the processed residue based on the determined weight of the first portion in relation to the weight of the second portion.

2. The residue collector of claim 1, wherein the controller is configured to determine the quality factor during the training harvesting operation.

3. The residue collector of claim 2, wherein the controller is further configured to provide an indicator of the determined quality factor to an operator of the combine harvester during the training harvesting operation.

4. The residue collector of claim 1 wherein:

the residue separator is configured for separating the processed residue into three or more portions based on one or more properties of the processed residue;

the one or more weight sensors are for directly or indirectly determining the weight of each portion; and the controller is configured to determine the quality factor for the processed residue based on relative weights of the three or more portions.

5. The residue collector of claim 1, wherein the property of the residue that is used to separate the residue into the first portion and the second portion comprises one or more of:

a size of elements within the residue;

a shape of elements within the residue;

a density of elements within the residue;

a moisture content of the residue; and a colour of the residue.

6. The residue collector of claim 1, wherein the residue collector comprises a trailer, which is configured to be pulled by the combine harvester when in use.

7. The residue collector of claim 1, wherein the residue collector has a residue collection configuration and a residue bypass configuration, wherein:

in the residue collection configuration, the residue collector is configured to transfer the residue to components of the residue collector for determining the quality factor for the residue; and in the residue bypass configuration, the residue collector is configured such that the residue bypasses or avoids the components of the residue collector for determining the quality factor for the residue.

8. The residue collector of claim 1, further comprising a residue selection component for selectively transferring only part of the received residue to the residue separator.

9. The residue collector of claim 1, wherein the controller is further configured to:

receive one or more sensor values from sensors that are associated with the combine harvester; and store the one or more sensor values and the quality factor as training data for a machine learning algorithm.

10. The residue collector of claim 9, wherein the controller is further configured to:

train a machine learning algorithm based on the training data, wherein the trained machine learning algorithm is for subsequent use during a harvesting operation.

11. The residue collector of claim 5, wherein the property of the residue that is used to separate the residue into the first portion and the second portion comprises the size of the elements within the residue.

12. The residue collector of claim 5, wherein the property of the residue that is used to separate the residue into the first portion and the second portion comprises the shape of the elements within the residue.

13. The residue collector of claim 5, wherein the property of the residue that is used to separate the residue into the first portion and the second portion comprises the density of the elements within the residue.

14. The residue collector of claim 5, wherein the property of the residue that is used to separate the residue into the first portion and the second portion comprises the moisture content of the residue.

15. The residue collector of claim 5, wherein the property of the residue that is used to separate the residue into the first portion and the second portion comprises the colour of the residue.

16. A method of training a machine learning algorithm and operating a combine harvester using the trained machine algorithm, the method comprising the steps of:

training the machine learning algorithm by operating a residue collector, which is separate from the combine harvester, during a training harvesting operation, the step of operating the residue collector comprising (i) activating a transfer system of the residue collector to transfer processed residue expelled from the combine harvester to a residue separator of the residue collector, (ii) activating the residue separator to separate the processed residue into a first portion and a second portion based on a property of the processed residue, (iii) directly or indirectly determining a weight of the first portion and the second portion using one or more weight sensors, and (iv) determining a training quality factor for the processed residue based on the determined weight of the first portion in relation to the weight of the second portion;

starting a harvesting operation following the training harvesting operation;

receiving one or more sensor values from sensors that are associated with the combine harvester during the harvesting operation;

using the trained machine learning algorithm to determine a calculated quality factor during the harvesting operation, the machine learning algorithm determining the calculated quality factor based on the training quality factor determined during the training step; and either presenting the calculated quality factor to an operator of the combine harvester during the harvesting operation or setting one or more operational parameters of the combine harvester during the harvesting operation based on the calculated quality factor.

17. The method of claim 16 further comprising setting one or more operational parameters of the combine harvester during the harvesting operation based on the calculated quality factor and also based on a target quality factor.

18. The method of claim 16 further comprising presenting the calculated quality factor to the operator of the combine harvester during the harvesting operation.

19. The method of claim 16, wherein the property of the residue that is used to separate the residue into the first portion and the second portion comprises one or more of:

a size of elements within the residue;

a shape of elements within the residue;

a density of elements within the residue;

a moisture content of the residue; and a colour of the residue.

\* \* \* \* \*